United States Patent
Hofmann et al.

(10) Patent No.: US 6,737,033 B1
(45) Date of Patent: May 18, 2004

(54) METHOD AND DEVICE FOR THE CATALYTIC REMOVAL OF A POLLUTANT CONTAINED IN AN EXHAUST GAS OF A COMBUSTION SYSTEM

(75) Inventors: Lothar Hofmann, Altenkunstadt (DE); Wieland Mathes, Michelau (DE)

(73) Assignee: Siemens Aktiengesellschaft, Munich (DE)

( * ) Notice: Subject to any disclaimer, the term of this patent is extended or adjusted under 35 U.S.C. 154(b) by 562 days.

(21) Appl. No.: 09/677,356

(22) Filed: Oct. 2, 2000

Related U.S. Application Data

(63) Continuation of application No. PCT/DE99/00746, filed on Mar. 17, 1999.

(30) Foreign Application Priority Data

Mar. 31, 1998 (DE) .......................................... 198 14 386

(51) Int. Cl.$^7$ .............................................. B01D 53/56
(52) U.S. Cl. ................... 423/239.1; 423/235; 422/172; 422/177; 422/180; 60/274; 60/301
(58) Field of Search ................. 422/168–172, 422/177, 180; 60/274, 299, 300, 301; 423/235, 239.1

(56) References Cited

U.S. PATENT DOCUMENTS

| | | | |
|---|---|---|---|
| 5,047,220 A | 9/1991 | Polcer | 423/239 |
| 5,512,259 A | * 4/1996 | Hagenmaier et al. | 423/239.1 |
| 5,628,186 A | 5/1997 | Schmelz | 60/274 |

FOREIGN PATENT DOCUMENTS

| | | |
|---|---|---|
| EP | 0 697 062 B1 | 2/1996 |
| JP | 04 265 124 A | 9/1992 |

* cited by examiner

*Primary Examiner*—Hien Tran
(74) *Attorney, Agent, or Firm*—Laurence A. Greenberg; Werner H. Stemer; Ralph E. Locher

(57) ABSTRACT

The method and the device are configured for the catalytic removal of a pollutant contained in an exhaust gas of a combustion system using a reagent. A temporal mean, or time average, is formed for the concentration of the pollutant in the exhaust gas. The catalytic converter is laid out for complete conversion if the reagent is introduced stoichiometrically. Here, the reagent is introduced in substoichiometric proportions with respect to the time average of the pollutant content.

17 Claims, 1 Drawing Sheet

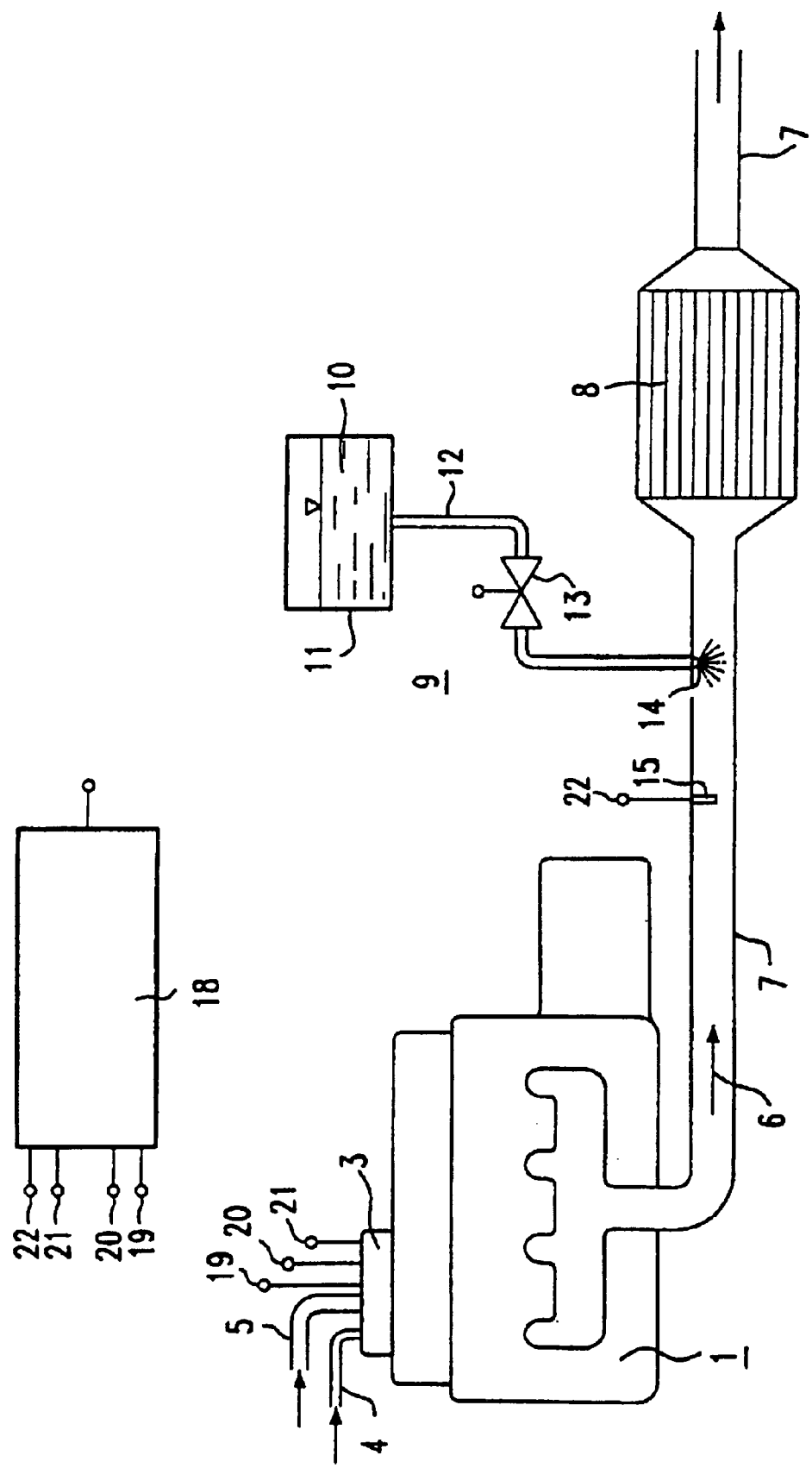

METHOD AND DEVICE FOR THE CATALYTIC REMOVAL OF A POLLUTANT CONTAINED IN AN EXHAUST GAS OF A COMBUSTION SYSTEM

CROSS-REFERENCE TO RELATED APPLICATION

This is a continuation of copending international application PCT/DE99/00746, filed Mar. 17, 1999, which designated the United States.

BACKGROUND OF THE INVENTION

Field of the Invention

The invention relates to a method for the catalytic removal of a pollutant contained in an exhaust gas of a combustion system. A predetermined amount of a reagent is thereby introduced into the exhaust gas as a function of the concentration of the pollutant per unit time and is reacted with the pollutant at a catalytic converter. The invention also relates to a device for carrying out the method.

The combustion of a fossil fuel or of refuse in a combustion system leads to the formation of not inconsiderable quantities of pollutants, such as nitrogen oxides, hydrocarbons, carbon monoxide, sulfur oxide and, in particular, dioxins and furans. These may pass into the environment via the exhaust gas from the combustion system. Examples of a pollutant-emitting combustion system of this nature include a boiler system, a coal-fired, oil-fired or gas-fired fossil power plant, a gas turbine, or an internal-combustion engine, in particular a diesel engine. Refuse incineration plants also emit the above-mentioned pollutants.

On account of strict statutory regulations which limit the amount of the above-mentioned pollutants which may be released, all the above-mentioned combustion systems require additional treatment of the exhaust gases in order to reduce, the level of pollutants contained therein. To this end, a wide variety of catalytic converters which convert the pollutants into compounds which are not hazardous have been developed in the past.

For example, to reduce the level of pollutants in the exhaust gas from a spark-ignition engine (Otto cycle), catalytic converters which contain precious metals are known, at which hydrocarbons and carbon monoxide together with nitrogen oxides are converted to form carbon dioxide, nitrogen and/or water. Catalytic converters for breaking down dioxins and/or furans are also known, comprising a catalytically active material based on titanium dioxide. At those catalytic converters the dioxins and/or furans are oxidized with residual oxygen which is present in the exhaust gas to form compounds which are not harmful.

If the exhaust gas composition is unsuitable, it may be necessary for an additional reagent to be added to the exhaust gas, which reagent reacts with the pollutant to be eliminated at a suitable catalytic converter, forming harmless compounds. By way of example, to break down nitrogen oxides in oxygen-containing exhaust gases, a suitable reducing agent has to be added to the exhaust gas as a reagent. The reducing agent reduces the nitrogen oxides which are present in the exhaust gas to form harmless nitrogen even in the presence of oxygen. This reaction can be catalyzed by a so-called DeNOx catalytic converter based on titanium dioxide with added vanadium pentoxide, molybdenum trioxide, and/or tungsten trioxide, a which uses the selective catalytic reduction process to react nitrogen oxides with a suitable reducing agent, such as ammonia, to form nitrogen and water.

To fully break down the pollutant in the exhaust gas, the reagent which is added separately must be added in a stoichiometric amount with respect to the concentration of the pollutant. However, since in combustion systems the concentration of the pollutant in the exhaust gas often fluctuates over time and since, in addition, other factors of the exhaust gas, such as temperature or pressure, influence: the reaction of the pollutant with the reagent, excessive quantities of the reagent are metered in relatively frequently. This leads to the reagent being emitted into the environment together with the exhaust gas. This emission of reagent, which is also known as reagent slippage or simply slippage, has to be avoided if the reagent itself is harmful. In addition, excessive metering of the reagent also always means that operation is uneconomic, since expensive reagent remains unused in the exhaust gas.

Therefore, considerable technical outlay is devoted to attempting to meter the reagent in stoichiometric proportions which are as exact as possible and adapted to the current state of the exhaust gas. In this context, to determine the amount of reagent which is to be introduced into the exhaust gas per unit time, it is not only necessary for the concentration of the pollutant in the exhaust gas to be either directly measured or calculated on the basis of characteristic curves derived from relevant operating parameters of the combustion system, but rather, in addition, it is also necessary to take into account relevant operating parameters of the catalytic converter, e.g. catalytic converter temperature, catalytic activity or storage capacity, and parameters of the exhaust gas, e.g. pressure, gas composition or temperature, using suitable analysis methods. A technically complex method of this nature for determining the amount of a reagent metered into an exhaust gas containing nitrogen oxides is known, for example, from U.S. Pat. No. 5,628,186 (see European Patent EP 0 697 062 B1).

However, a complex method of this nature with an expensive measurement analysis system is inappropriate for retrofitting in relatively old combustion systems in particular for cost reasons. Also, in particular in the exhaust system of internal-combustion engines used to drive vehicles, there is no further additional space for sensor elements which are required to record parameters that are specific to the exhaust gas or catalytic converter. In addition, the required introduction device has to be of highly dynamic design in order to achieve exact metering, so that it can respond quickly and accurately under every operating state of the combustion system with corresponding exhaust gas parameters. This also entails excessive costs.

SUMMARY OF THE INVENTION

It is accordingly an object of the invention to provide a method and device, which overcomes the above-mentioned disadvantages of the heretofore known devices and methods of this general type and which provides for a particularly inexpensive and simple method for the catalytic removal of a pollutant contained in an exhaust gas of a combustion system by reacting a reagent, without allowing, in the process, any significant slippage or excessive consumption of reagent to occur. It is a further object to also provide a device for carrying out the method which is particularly simple, takes up little space and, in addition, is inexpensive.

With the foregoing and other objects in view there is provided, in accordance with the invention, a method of catalytically removing a pollutant contained in an exhaust gas of a combustion system, which comprises:

determining a time average for a concentration of a pollutant in the exhaust gas;

providing a catalytic converter designed for substantially complete conversion of the pollutant given stoichiometric metering of a reagent with respect to the pollutant;

introducing a substoichiometric amount of reagent, in dependence on the time average for the concentration of the pollutant, into the exhaust gas; and conducting the exhaust gas with the reagent to the catalytic converter and reacting the reagent with the pollutant at the catalytic converter.

In other words, the time average, or temporal mean, is formed for the concentration of the pollutant, and, in the case of a catalytic converter which, given stoichiometric metering of the reagent, is designed for substantially complete conversion of the pollutant, the reagent is introduced into the exhaust gas in substoichiometric proportions with respect to the average.

In a first step, the invention is based on the fact that it is possible to avoid reagent slippage if the pollutant is not converted completely, but rather only to a significant extent. In fact, in such a case, the reagent can be metered in substoichiometric proportions according to the desired conversion level throughout the entire operating period of the combustion system. This offers sufficient security in the event of minor fluctuations in the concentration of the pollutant in the event of unpredictable operating states of the combustion system. However, with a procedure of this nature the same problem as with stoichiometric metering in any operating state remains. Even in the case of substoichiometric metering, it is necessary to ensure for every operating state of the combustion system that metering is actually taking. place in substoichiometric proportions according to the current concentration of the pollutant in the exhaust gas. Therefore, analytical measurement instruments are once again required in order to prevent slippage of reagent.

In a second step, the invention is based on the fact that this outlay can be avoided if it is not each operating state of the combustion system on its own, but rather the operating period of the combustion system as a temporal medium which is taken into consideration. If a temporal mean for the concentration of the pollutant in the exhaust gas is determined and the reagent is introduced into the exhaust gas in substoichiometric proportions with respect to the mean, fluctuations in the concentration of the pollutant are absorbed without any additional emission of reagent. If the current concentration of the pollutant in the exhaust gas is lower than the mean of the concentration which has been determined over a certain period or over a plurality of operating states, the additional amount of reagent is simply reacted with the additional pollutant which is present at the catalytic converter and is consumed in full. Naturally, this only applies if the catalytic converter is designed, in such a manner that substantially complete conversion of the pollutant, is achieved if the reagent is metered in in stoichiometric proportions with respect to the pollutant. If the current concentration of the pollutant exceeds the mean, the additional quantity of pollutant remains in the exhaust gas as an unconverted fraction, but over the operating period of the combustion system, this does not diminish the overall conversion rate, which although not complete is still considerable.

The method according to the invention offers the advantage that there is no need for any complex analytical measurement appliances and sensors for monitoring the current exhaust gas composition, for monitoring the current exhaust gas temperature or for monitoring the current operating state of the catalytic converter, yet reagent slippage is nevertheless reliably avoided. There is also no need to impose any high demands on the introduction device for introducing the reagent into the exhaust gas with regard to the metering accuracy or the dynamics, since fluctuations in the amount of reagent introduced are absorbed by the fact that the metering is in any case substoichiometric. All this means that the method is predestined for use for exhaust gas cleaning on old systems or on combustion systems in which, to comply with statutory exhaust gas regulations, it is not absolutely necessary, for all the pollutant in the exhaust gas to be removed. This applies in particular to internal-combustion engines which are used to drive vehicles, in particular to diesel engines, for which the restrictions on pollutant emissions which are allowable are only being reduced gradually.

In particular, it has been found that slippage of reagent or, secondary products which form therefrom can be reliably avoided if the reagent is introduced into the exhaust gas from the combustion system in substoichiometric proportions with respect to the mean, in such a manner that a proportion of between 55 and 95% of the pollutant is actually converted. In this case, fluctuations in the emission of pollutant are reliably compensated for without reagent being emitted. The reagent is advantageously introduced in substoichiometric proportions with respect to the mean, in such a manner that the proportion of the pollutant converted is 75%. In this case, the pollutant is broken down to a considerable extent and, at the same time, there is a sufficient safety margin to compensate for fluctuations in the amount of reagent and/or the concentration of pollutant, without there being any additional emission of reagent downstream of the catalytic converter.

The reagent can be metered in a simple way in that, during an operating state of the combustion system in which the pollutant emission is approximately constant over time, the reagent is also introduced in constant substoichiometric proportions. By way of example, if a mean conversion of the pollutant of 80% over the operating period of the combustion system is desired, during an operating state of this nature an amount of reagent which is simply reduced by the appropriate factor with respect to the stoichiometric amount is introduced into the exhaust gas according to the concentration of pollutant which is present in the exhaust gas.

In accordance with an advantageous feature of the invention, the concentration of the pollutant may be determined directly by a suitable sensor in the exhaust gas. It is then possible to form a temporal mean from the measured values recorded, according to which mean metering is carried out in substoichiometric proportions. The period over which the mean is determined depends on the combustion system. Even in a combustion system with frequent load changes, there is no need to impose high demands on a sensor of this type in terms of its response speed.

Advantageously, the value for the concentration of the pollutant which is determined by a relatively slow sensor is directly taken into account as a mean for the correspondingly substoichiometric addition of the reagent.

Alternatively, the concentration of the pollutant in the. exhaust gas may be determined on the basis of relevant operating parameters of the combustion system. For this purpose, a corresponding characteristic diagram is stored in a suitable control unit, this diagram representing a functional relationship between an operating state of the combustion system which is defined by the relevant operating parameters and the concentration of the pollutant in the exhaust gas. Relevant operating parameters may, for example, be the combustion temperature, the level of fuel conversion, the oxygen consumption or the load. In an internal-combustion engine, the accelerator pedal position, the rotational speed or the torque are also available as relevant operating parameters of this nature.

The method described is suitable in particular for removing nitrogen oxide using the SCR process. In this case, a suitable reagent is advantageously ammonia or a substance which releases ammonia, in particular urea.

With the above and other objects in view there is-also provided, in accordance with the invention, a device for catalytically removing a pollutant contained in an exhaust gas of a combustion system, comprising:

an exhaust pipe conducting an exhaust gas;
an introduction device communicating with the exhaust pipe for introducing a reagent into the exhaust gas;
a catalytic converter configured to conduct a flow of the exhaust gas and for reacting the reagent with a pollutant contained in the exhaust gas, the catalytic converter being configured to substantially completely convert the pollutant if the reagent is metered into the exhaust gas in stoichiometric proportions with respect to a concentration of the pollutant; and
a control unit connected to the introduction device for controlling a reagent throughput in the introduction device in dependence on the concentration of the pollutant in the exhaust gas, and for determining a time average of the concentration of the pollutant in the exhaust gas and for metering in the reagent substoichiometrically according to the time average.

In other words, to carry out the method, the invention provides a device for the catalytic removal of a pollutant contained in an exhaust gas of a combustion system, having an exhaust pipe, having an introduction device for introducing the reagent into the exhaust gas, having a catalytic converter through which the exhaust gas/reagent mixture can flow, for reacting the reagent with the pollutant, and having a control unit for controlling the reagent throughput in the introduction device as a function of the concentration of the pollutant in the exhaust gas, in which device, according to the invention, the catalytic converter is designed in such a manner that, if the reagent is metered in in stoichiometric proportions with respect to the concentration of the pollutant, the pollutant is substantially completely converted, and in which device the control unit is designed to determine a temporal mean of the concentration of the pollutant in the exhaust gas and for substoichiometric metering according to the mean. Advantageously, the control unit is designed for substoichiometric metering, in such a manner that the proportion of the pollutant which is converted at the catalytic converter is between 55 and 95%, preferably 75%. For this purpose, the control unit records the current value of the concentration of the pollutant in the exhaust gas and, from this value, determines a mean of the concentration which is determined over a certain period. Then, a correspondingly substoichiometric amount of reagent is introduced into the exhaust gas via the introduction device using a predetermined reduction factor with respect to the stoichiometric amount.

In a combustion system which is operated with frequent load changes, it is for this purpose advantageously possible for the control unit to recognize operating states in which the emission of pollutant is virtually constant and to meter in u substoichiometric proportions of reagent during this period in a suitable way. All that is required is for the desired mean conversion of the pollutant to be between 55 and 95%, preferably 75%.

The introduction device itself may in a known way be in the form of an injection valve, an injection nozzle or, in the case of large systems, in the form of a spray grid distributed over the cross section of the exhaust pipe. The metering may be effected either by direct control of the injection nozzle or the injection valve or via a controllable valve provided in the feed line for the reagent.

To record the concentration of the pollutant in the exhaust gas, a suitable sensor is advantageously arranged in the exhaust line between the combustion system and the catalytic converter. If a long response time means that the sensor takes a mean over various operating states of the combustion system, there is no need for the control unit itself to recognize operating states in which the emission of pollutant is approximately constant. It is merely necessary for the value of the concentration of the pollutant determined by means of the sensor to be taken into account for substoichiometric metering.

In accordance with another advantageous configuration of the invention, the concentration of the exhaust gas is determined on the basis of relevant operating parameters of the combustion system. For this purpose, as described above; a corresponding characteristic diagram or characteristic curve is stored in the control unit. To determine the relevant operating parameters, the control unit is assigned suitable sensor elements. This procedure is recommended in particular in an internal-combustion engine which has an electronic engine management system and therefore a suitable electronic interface. Information concerning the operating state of the combustion system, such as for example combustion temperature, fuel consumption, torque, rotational speed, as well as injection time and the like, can be extracted easily via; an interface of this type. The sensors provided for this purpose form part of the prior art.

Particularly for the removal of nitrogen oxides using the SCR process, it is advantageous if the catalytic converter is designed as a DeNOx catalytic converter in honeycomb form and comprises the materials titanium dioxide in a proportion of 70 to 95% by weight, tungsten trioxide and/or molybdenum trioxide in a proportion of 5 to 20% by weight, and vanadium pentoxide in a proportion of less than 5% by weight. For this purpose, the reagent used may be ammonia or a substance which releases ammonia, such as urea.

Other features which are considered as characteristic for the invention are set forth in the appended claims.

Although the invention is illustrated and described herein as embodied in a method and device for the catalytic removal of a pollutant contained in an exhaust gas of a combustion system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The figure of the drawing is a schematic diagram of a diesel engine with a connected device for the catalytic removal of the nitrogen oxides from the exhaust gas.

DESCRIPTION OF THE PREFERRED EMBODIMENTS

Referring now to the sole figure of the drawing in detail, the exemplary combustion system shown therein is a diesel engine 1 which is fitted with an exhaust-gas cleaning device for eliminating nitrogen oxides. The diesel engine 1 has an interface 3 from which the current values of relevant operating parameters can be derived by electronic means. A fuel/air mixture for combustion is supplied to the diesel engine via a fuel feed 4 and an air intake 5. The exhaust gas 6 from the diesel engine is passed via a manifold into an exhaust pipe 7 and is discharged to the outside via a catalytic converter 8. In this case, the catalytic converters 8 is a so-called DeNOx catalytic converter which uses the known SCR (selective catalytic reduction) process to break down nitrogen oxides with the aid of the reagent ammonia to form molecular nitrogen and water. The amount of ammonia required is obtained by hydrolysis from urea which is metered in.

To meter the urea, an introduction device 9 is provided, which comprises a tank 11 for the reagent 10 (=urea), a feed line 12, a metering valve 13 and an injection nozzle 14.

The catalytic converter 8 for breaking down the nitrogen oxides is designed as an unsupported extrudate in honeycomb form made from a ceramic mass comprising 90% by weight titanium dioxide, 8% by weight tungsten trioxide and less than 2% by weight vanadium pentoxide. The catalytic converter 8 is designed in such a manner that even when the maximum level of nitrogen oxides is being emitted, the nitrogen oxides are substantially completely broken down if the reagent 10 is metered in in stoichiometric proportions.

In addition, a commercially available pollutant sensor 15 for recording the nitrogen oxide concentration as a result of a change in conductivity is arranged in the exhaust pipe 7 between the diesel engine 1 and the catalytic converter 8.

To control the introduction device, a control unit 18 is provided. The current values for fuel consumption, speed and torque are available to the control unit via the outputs 19, 20 and 21 of the interface 3 of the diesel engine. Furthermore, it is possible to access the measured nitrogen oxide emissions from the diesel engine via the output 22 of the pollutant sensor 15.

It is optionally possible for the nitrogen oxide concentration, which is determined via the pollutant sensor 15 or is calculated using a characteristic curve which is implemented in the control unit 18 on the basis of the relevant operating parameters fuel consumption, speed and torque, to be used directly in order to determine the amount of reagent 10 which is to be introduced per unit time.

In operating states of the combustion system in which the concentration of the nitrogen oxides in the exhaust gas is approximately constant over time, the control unit 18 controls the metering valve 13 of the introduction device 9 in such a manner that an amount of reagent 10 which is reduced correspondingly according to a predeterminable reduction factor with respect to the stoichiometric amount of reagent 10 is added to the exhaust gas 6 per unit time. The urea introduced breaks down in the exhaust gas 6 as a result of hydrolysis, forming ammonia and residues. The ammonia reacts as a reagent with the nitrogen oxide at the catalytic converter 8. For the control unit, it is possible to input a conversion level for the pollutant of between 55 and 95%.

In the case where the concentration of the pollutant is calculated from relevant operating parameters, the control unit 18 records an average over a period of minutes. In the case where the concentration is determined by means of the pollutant sensor 15, the directly measured value is used as a mean.

We claim:

1. A method of catalytically removing a pollutant contained in an exhaust gas of a combustion system having a plurality of operating states with varying pollutant emissions, which comprises:

providing a catalytic converter constructed for substantially complete conversion of the pollutant given stoichiometric metering of a reagent with respect to the pollutant;

determining an average value of a pollutant concentration in the exhaust gas upstream of the catalytic converter over a plurality of the operating states;

introducing a substoichiometric amount of reagent, in dependence on the average value of the pollutant concentration in the exhaust gas upstream of the catalytic converter, into the exhaust gas; and conducting the exhaust gas with the reagent to the catalytic converter and reacting the reagent with the pollutant at the catalytic converter.

2. The method according to claim 1, wherein the introducing step comprises introducing the reagent into the exhaust gas in substoichiometric proportions with respect to the mean, such that a proportion of the pollutant which is actually converted at the catalytic converter is between 55 and 95%.

3. The method according to claim 2, which comprises introducing the reagent in substoichiometric proportions with respect to the time average for converting substantially 75% of the pollutant.

4. The method according to claim 1, which comprises operating the combustion system with approximately temporally constant emission of pollutant, and thereby introducing the reagent in temporally constant substoichiometric proportions.

5. The method according to claim 1, wherein the determining average step comprises measuring the concentration of the pollutant directly in the exhaust gas.

6. The method according to claim 5, wherein the determining average step comprises measuring the pollutant with a pollutant sensor.

7. The method according to claim 1, wherein the determining step comprises determining the time average on the basis of relevant operating parameters of the combustion system.

8. The method according to claim 1, wherein the reagent is ammonia.

9. The method according to claim 1, wherein the reagent is urea.

10. The method according to claim 1, wherein the pollutants are nitrogen oxides and the providing step comprises providing a DeNOx catalytic converter for selective catalytic reduction process.

11. A device for catalytically removing a pollutant contained in an exhaust gas of a combustion system having a plurality of operating states with varying pollutant emissions, comprising:

an exhaust pipe conducting an exhaust gas;

an introduction device communicating with said exhaust pipe for introducing a reagent into the exhaust gas;

a catalytic converter configured to conduct a flow of the exhaust gas and for reacting the reagent with a pollutant contained in the exhaust gas, said catalytic converter being configured to substantially completely convert the pollutant if the reagent is metered into the exhaust gas in stoichiometric proportions with respect to a concentration of the pollutant; and a control unit connected to said introduction device for controlling a reagent throughput in said introduction device in dependence on the concentration of the pollutant in the exhaust gas, and for determining an average value of a pollutant concentration in the exhaust gas upstream of the catalytic converter over a plurality of the operating states and for metering in the reagent substoichiometrically according to the average value of a pollutant concentration in the exhaust gas upstream of the catalytic converter.

12. The device according to claim 11, wherein said control unit is programmed for substoichiometric metering of the reagent, such that a proportion of the pollutant being converted at said catalytic converter is between 55 and 95%.

13. The device according to claim 12, wherein said control unit is programmed to cause a 75% pollutant conversion.

14. The device according to claim 11, wherein said control unit is configured to form the time average during an operating state of the combustion system in which a pollutant emission is substantially constant.

15. The device according to claim 11, which comprises a pollutant sensor connected to said control unit and disposed at said exhaust pipe between the combustion system and said catalytic converter, said pollutant sensor detecting the concentration of the pollutant in the exhaust gas.

16. The device according to claim 11, wherein said control unit receives relevant operating parameters of the combustion system from sensor elements, and said control unit is configured to determine the concentration of the pollutant in the exhaust gas on the basis of the relevant operating parameters.

17. The device according to claim 11, wherein said catalytic converter is a DeNOx catalytic converter in honeycomb form for removing nitrogen oxides with a reducing agent, said catalytic converter being formed of titanium dioxide in a proportion from 70 to 95%, tungsten trioxide and molybdenum trioxide from 5 to 20%, and vanadium pentoxide at less than 5% by weight.

* * * * *